United States Patent Office 3,328,468
Patented June 27, 1967

3,328,468
METHOD OF PREPARING THE HOMOPOLYMER OF THE MONOVINYL ETHER OF DIETHYLENE GLYCOL
Robert M. Nowak, Midland, Mich., assignor to The Dow Chemical Company, Midland, Mich., a corporation of Delaware
No Drawing. Filed Feb. 19, 1964, Ser. No. 345,854
7 Claims. (Cl. 260—615)

This invention relates to the process for producing polymers of vinyl ethers and more particularly, it relates to the polymerization of monovinyl ethers of aliphatic diols.

The polymerization of vinyl ethers is well known. Monovinyl ethers of diols have been polymerized by means of cationic initiators producing a liquid type polymer. However, this type of reaction induces the addition of the hydroxyl group to the double bond resulting in an acetal formation and the loss of the hydroxyl group. Monovinyl ethers of diols may be polymerized in bulk or solution by means of a free radical mechanism to produce polymers that are a viscous liquid or soft, resinous-type polymer. However, such methods have not been satisfactory since the reactions are slow, difficult to control and carry to completion and frequently lead to insoluble crosslinked products.

It is an object of the present invention to provide a vinyl addition polymer of a monovinyl ether of an aliphatic diol. It is another object to provide a process for producing such a polymer. It is a further object to provide a polymer which retains the hydroxyl group of the monomer during the polymerization reaction. A more specific object is to provide a vinyl addition polymer of low molecular weight ($<2000$) by reacting a vinyl ether monomer with an organic peroxygen, free radical type initiator, thereby promoting a reaction which provides a high rate of conversion of monomer to polymer. These and other objects, advantages, features, and variations will become apparent to those skilled in the art.

In accordance with the present invention, the above and other objects are attained by polymerizing a monovinyl ether of an aliphatic diol in the presence of a peroxygen type initiator in the manner and under the conditions particularly set forth below to obtain a non-crosslinked polymer of low molecular weight.

In a preferred embodiment of the present invention, the monovinyl ether of an aliphatic diol is polymerized with an organic peroxygen initiator in a reactor, at a temperature of about 80° to about 250° C., preferably from about 100° to about 220° C., and at pressures from about 1 atmosphere to about 100 atmospheres. The reaction is continued with further addition of the peroxygen initiator until the polymer mixture within the reactor contains about 10 percent to 25 percent residual unsaturation at which time the reaction is stopped. The reaction product is carefully devolatilized to remove the unreacted monomer, leaving the polymer product. Residual unsaturation after devolatilization is about 3 percent to 15 percent.

The term "residual unsaturation" is defined as the proportion expressed as percent by weight of the carbon-carbon double bonds present in the reaction mixture relative to those present in the monomeric starting material. Thus, the unsaturation in the monomeric starting material being regarded as 100 percent, as the polymerization reaction proceeds and the carbon-carbon double bonds are thereby consumed in formation of the polymer, the remaining carbon-carbon double bonds ("residual unsaturation") diminish toward (but not to) 0 percent. The carbon-carbon double bonds in the reaction mixture are quantitatively measured by a standard iodine titration and computed as a percentage by weight of the double bonds present in the starting monomeric material.

Residual unsaturation in the polymerization reaction product is caused in part by unreacted monomer and in part by unsaturated linkages present in the polymer itself as the result of chain transfer during the polymerization reaction.

It is essential that the amount of initiator added to the reactor be carefully controlled and also that the initiator be of the type which will promote a desirable rate of polymerization. As the catalyst is initially introduced into the reactor, the reaction may be quite vigorous causing a substantial rise in temperature. In order to properly control the rate of reaction and the extent of the polymerization, the initial catalyst must be of the type that has a half-life of no greater than about 10 minutes, thereby actively initiating the polymerization reaction, yet be present in a limited amount thereby preventing the reaction from going uncontrollably to completion. To obtain the polymer of this invention, it is desirable that the reaction proceed until the residual unsaturation of the remaining product is from about 10 percent to about 25 percent. It is a feature of the present invention that the catalyst is not added all at once, but that the reaction is initiated by starting with an initial portion and sustained by later additions of the remainder of the catalyst, or a different catalyst, during the course of the polymerization. After the initial amount of catalyst has been added and the reaction has subsided, a further amount of catalyst is added slowly, preferably dropwise, until 10 percent to 25 percent residual unsaturation is attained. If the reaction is not carefully controlled and the residual unsaturation becomes less than about 10 percent, crosslinking occurs producing a gelled solid rather than the desired liquid non-crosslinked polymer.

The free radical polymerization of the monomer of this invention does not substantially affect the hydroxyl group. Tests show the hydroxyl content of the polymer of the monovinyl ether of diethylene glycol to be from about 10 percent to about 12 percent compared with the theoretical value of 12.9 percent by weight, based on the polymer. The product is a vinyl addition polymer, not an acetal condensation polymer.

Initiators used in the present invention must have a half-life of between about 0.01 minute to about 10 minutes and preferably from about 0.1 minute to about 5 minutes at the polymerization temperature employed.

In the early stages of polymerization and up to about 50 percent residual unsaturation, the initiator may have a half-life of about 10 minutes, but as the polymerization reaction progresses toward completion, it is most advantageous to use conditions such that the initiator has a half-life of less than 2 minutes. If an initiator with a long half-life at the polymerization temperature is used, a gelled crosslinked product is obtained. Catalysts useful in the present invention are organic peroxygen-containing compounds such as organic peroxides, peresters and hydroperoxides. Specific examples of catalysts are di-tertiary-butyl peroxide, tertiary-butyl peracetate, tertiary-butyl hydroperoxide, 2,4-dichlorobenzoyl peroxide, caprylyl peroxide, lauroyl peroxide, benzoyl peroxide and the like.

The reaction mixture is usually heated in order to activate the selected catalyst to the optimum half-life rate. For example, di-t-butyl peroxide reacts favorably to produce a polymer of this invention at temperatures of from about 180° to about 200° C. but reacts very poorly at 140° C. Therefore, external heat is applied to provide the desired temperature.

Polymers are obtained by maintaining the catalyst concentration in the range of from about 0.05 to about 4 mole percent and preferably within the range from about 0.2 to about 2 mole percent. Higher concentrations of catalyst cause the reaction to proceed at a rate difficult to control due to the exothermic nature of the polymerization. Under these conditions, the resulting product is a crosslinked gelatinous solid rather than the desired liquid polymer.

Compounds that may be polymerized in accordance with the process of the present invention are monovinyl ethers of aliphatic diols, wherein the diol contains a total of 2 to 25 carbon atoms per molecule. Specific examples of such compounds are the monovinyl ethers of ethylene glycol, diethylene glycol, triethylene glycol, tetraethylene glycol, propylene glycol, dipropylene glycol, tripropylene glycol, 1,4-butanediol, 1,3-butanediol, 1,5-pentanediol, 1,4-pentanediol, 1,3-pentanediol, 1,2-pentanediol and other aliphatic diols with or without ether linkages and with the diol portion of the monomer having a molecular weight of from about 62 to about 400, where one hydroxyl group of the diols is preferably a primary hydroxyl group.

Experimental tests show that the most desirable temperatures for producing polymers of this invention are between about 80° and 250° C. The polymerization may be carried out, however, at lower or higher temperatures depending upon the type of catalyst used and particularly its half-life. The polymerization reaction may be conducted in open vessels or in closed vessels under pressure where the boiling point of the monomer or catalyst makes these conditions necessary. A nitrogen atmosphere may be used during polymerization to aid in controlling the reproducibility of the reaction.

The polymerization products obtained in accordance with the present invention are viscous, syrup-like, saturated liquids with a viscosity of from about 1.5 to about 7 cps. at 25° C. (10 percent solution viscosity in water) and have a hydroxyl content of from about 80 percent to 98 percent of the theoretical hydroxyl content of the vinyl addition polymer of the starting monomer. Of the many uses of this polymer product, the most significant is its use in the production of foams, particularly urethane foams. This polymer is an effective substitute for polyols currently being used in foam production and provides an excellent backbone for the crosslinked foam product.

The following examples are illustrative of the invention and are not intended to limit the scope thereof.

Example 1

Into a 500 ml. polymerization vessel, with a means of stirring, was placed 400 g. of monovinyl ether of diethylene glycol. The vessel and monomer were heated to 120° C. To the monomer was added 1.5 cc. of t-butyl peracetate (0.5 mole percent based on monomer present). Because of the heat of the polymerization reaction, the temperature rose to 140° C. External heat was applied when necessary to maintain a temperature of 140° C. After the reaction had been stirred for about 15 minutes, 1.5 cc. of t-butyl peracetate (half-life of about 5 minutes at 140° C.) was added dropwise over a period of 30 minutes. After one hour had elapsed, the polymerization was discontinued. A sample was removed from the reaction vessel and titrated by a standard iodine method to determine the amount of residual unsaturation. The tests showed residual unsaturation of about 10 percent, i.e. the carbon-carbon double bonds remaining in the reaction mixture were about 10 percent of such double bonds in the starting monomer mixture. A portion of the reaction mixture was then devolatilized at 0.1 to 1 mm. Hg at 100° to 130° C. for 1 hour. A sample was again titrated, the results of which showed residual unsaturation of about 4.5 percent. The polymer was a viscous, clear-to-pale-yellow syrup with a molecular weight of about 750. The molecular weight was determined by the freezing point depression method. The hydroxyl content of the polymer was determined to be about 10.8 percent by weight compared with 12.9 percent for the starting monomer of monovinyl ether of diethylene glycol.

Continued polymerization of the polymer product remaining in the reaction vessel produced a gelled solid, insoluble in water. A titration showed about 3 percent residual unsaturation.

Example 2

A test polymerization, not exemplary of this invention, was conducted in a manner similar to the method of Example 1 except that 2 cc. of t-butyl peracetate was added at the start and the polymerization reaction was continued for 2 hours. Subsequently, 3 cc. of t-butyl peracetate was added at one time. Within 10 minutes, the reaction became a gelled mass indicating extensive crosslinking. In order to obtain the fluid, non-crosslinked polymer of Example 1, it is necessary to control the concentration of the catalyst in the reaction mixture, e.g. by slow dropwise addition of the catalyst in the manner described.

Example 3

The process of Example 1 was repeated except that 1000 g. of monovinyl ether of diethylene glycol was placed in the reaction vessel. The temperature rose to about 220° C. upon the initial addition of 7.5 cc. of t-butyl peracetate. After the reaction had cooled to about 150° C., this temperature was maintained for 3 hours during which time an additional 4 cc. of t-butyl peracetate was slowly added. After the reaction had ceased, titrated samples were found to have about 15 percent residual unsaturation. After devolatilization, residual unsaturation was about 5 percent.

Example 4

The monovinyl ether of diethylene glycol was polymerized as in Example 3 except that the reaction was completed within a time of 1 hour. Residual unsaturation was about 12 percent. After devolatilization at 100° C. and 1 mm. Hg, residual unsaturation was reduced to 4 percent. The hydroxyl content was determined to be about 11.1 percent.

Example 5

One thousand grams of monovinyl ether of diethylene glycol was added to the polymerization vessel, heated to 130° C. and 1 cc. of t-butyl peracetate was added. The temperature rose to about 180° C. After the initial reaction had subsided, 3.5 cc. of t-butyl peroxide was added dropwise, maintaining the temperature at about 180° C. After 1½ hours of polymerization, the amount of residual unsaturation was found to be about 18 percent. After devolatilization, 6 percent residual unsaturation remained. The viscosity of the polymer produced was about 2.29 centipoises and the molecular weight was about 760.

Another test, similar to the above, was conducted using only t-butyl peroxide catalyst. After 2 hours, residual unsaturation was about 14 percent and after devolatilization, this was reduced to 4 percent. The product was a syrupy, colorless or slightly yellow liquid with a viscosity of 3.1 cps., molecular weight of about 950, and a hydroxyl content of about 11.5 percent.

Still another test was conducted using only t-butyl peroxide at a temperature of 205° C. for 1½ hours. The reaction product, not devolatilized, had a residual unsaturation of about 20 percent.

Example 6

A 250 g. sample of 1-vinyloxy-2-propanol was heated to 180° C., then 3 cc. of t-butyl peracetate was added a drop at a time. The temperature rose to 140° C. and was maintained at said temperature. After 6 hours, the residual unsaturation was determined to be about 11 percent and after devolatilization was reduced to 3 percent. The molecular weight of the polymer was about 660.

What is claimed is:

1. A process for producing a non-crosslinked polymer of a monovinyl ether of a polymethylene, polyethylene or polypropylene glycol, the glycol portion thereof having a molecular weight of 62 to 400, which comprises the steps of placing in a polymerization reaction zone the monovinyl ether and at least one and not more than two organic peroxygen containing catalyst to initiate the polymerization, said catalyst having a half-life of from about 0.01 minute to 10 minutes at the polymerization temperature and being present in an amount from about 0.05 to about 4 mole percent; maintaining a polymerization temperature from about 80° C. to about 250° C. adding incrementally additional amounts of organic peroxygen containing catalyst as the polymerization proceeds to maintain the catalyst concentration in the above-specified range and to obtain a reaction mixture with a double-bond residual unsaturation of from about 10 percent to about 25 percent by weight of carbon to carbon double bonds present in the reaction mixture based on the carbon to carbon double bonds present in the starting reaction mixture; devolatilizing said reaction mixture to obtain a final polymer product containing from about 3 percent to about 15 percent residual unsaturation, said polymer product containing from about 80 percent to about 98 percent of the original hydroxyl groups present in the monomer.

2. The process according to claim 1 wherein the monomer is a monovinyl ether of diethylene glycol.

3. The process according to claim 1 wherein the catalyst is t-butyl peracetate.

4. The process according to claim 1 wherein the catalyst is t-butyl peroxide.

5. The process according to claim 1 wherein the polymerization reaction is carried out at temperatures from about 80° to 250° C. and at pressures of from about 1 atmosphere to about 100 atmospheres.

6. A polymer of a monovinyl ether of a polymethylene, polyethylene or polypropylene glycol, the glycol portion thereof having a molecular weight of 62 to 400 wherein said polymer contains a hydroxyl content of from about 80 percent to 98 percent of the theoretical hydroxyl content of the vinyl addition polymer of the starting monomer, and a final carbon to carbon double-bond residual unsaturation of from about 3 percent to about 15 percent by weight based on the carbon to carbon double bonds present in the starting reaction mixture, which polymer is substantially non-crosslinked and soluble in water.

7. The composition according to claim 6 wherein said composition comprises a polymer of monovinyl ether of diethylene glycol.

References Cited

UNITED STATES PATENTS 2,104,000 12/1937 Reppe et al.
2,518,321 8/1950 Hoover _____ 260—615

FOREIGN PATENTS 537,429 2/1957 Canada.

LEON ZITVER, *Primary Examiner.*

H. T. MARS, *Assistant Examiner.*